(12) United States Patent
Mohr et al.

(10) Patent No.: US 7,876,109 B2
(45) Date of Patent: Jan. 25, 2011

(54) SENSOR FOR DETECTING THE POSITION OF A MOVABLE MAGNETIC OBJECT AND A CONVEYING DEVICE HAVING THE SENSOR

(75) Inventors: Godram Mohr, Altstätten (CH); Ignaz Hutter, Kriessern (CH); Thomas Stieger, Hinterforst (CH)

(73) Assignee: J.Wagner AG, Altstätten (CH)

( * ) Notice: Subject to any disclaimer, the term of this patent is extended or adjusted under 35 U.S.C. 154(b) by 222 days.

(21) Appl. No.: 12/040,235

(22) Filed: Feb. 29, 2008

(65) Prior Publication Data
US 2008/0211522 A1 Sep. 4, 2008

(30) Foreign Application Priority Data
Mar. 1, 2007 (EP) .................................. 07405066

(51) Int. Cl.
*G01R 27/08* (2006.01)
(52) U.S. Cl. ..................... 324/699; 324/207.24; 33/708
(58) Field of Classification Search .................. 324/699
See application file for complete search history.

(56) References Cited

U.S. PATENT DOCUMENTS

| | | | | |
|---|---|---|---|---|
| 4,336,518 A | * | 6/1982 | Holce et al. .................. 335/205 |
| 5,442,865 A | * | 8/1995 | Wallrafen ..................... 33/708 |
| 5,533,333 A | * | 7/1996 | Pullar et al. .................... 60/327 |
| 5,627,316 A | * | 5/1997 | De Winter et al. ........ 73/514.32 |
| 2004/0130319 A1 | * | 7/2004 | Eck et al. ................ 324/207.24 |
| 2005/0084386 A1 | * | 4/2005 | Mori et al. ................ 417/199.1 |
| 2009/0206846 A1 | * | 8/2009 | Sanchez et al. ............. 324/662 |

FOREIGN PATENT DOCUMENTS

| | | |
|---|---|---|
| DE | 43 35 004 A1 | 4/1995 |
| EP | 0 116 879 B1 | 8/1984 |
| GB | 2267392 A * | 1/1993 |
| GB | 2 267 392 | 12/1993 |

OTHER PUBLICATIONS

European Search Report for corresponding Application No. 07 40 5066 dated Jun. 12, 2007.

* cited by examiner

*Primary Examiner*—Melissa J Koval
*Assistant Examiner*—Benjamin M Baldridge
(74) *Attorney, Agent, or Firm*—Renner, Otto, Boisselle & Sklar, LLP (57) ABSTRACT

The sensor according to the invention for detecting the position of a movable magnetic object includes a resistance track and a contact electrode arranged thereon. Moreover the sensor includes a magnetic position transmitter, which is developed in such a way that it can follow the magnetic object, that it can be moved along the contact electrode and through which the contact electrode can be brought into contact with the resistance track.

15 Claims, 6 Drawing Sheets

# SENSOR FOR DETECTING THE POSITION OF A MOVABLE MAGNETIC OBJECT AND A CONVEYING DEVICE HAVING THE SENSOR

RELATED APPLICATION

The present application claims priority under 35 U.S.C. §119 to European Patent Application No. 07 405 066.7, filed on Mar. 1, 2007, the entire disclosure of which is incorporated herein by reference.

TECHNICAL FIELD

The invention relates to a sensor for detecting the position of a movable magnetic object and a conveying device having the sensor. The conveying device can be used for example for conveying and dosing coating material for coating work pieces.

BACKGROUND OF THE INVENTION

A device for dosing and mixing two components A and B is known from the European patent EP 0 116 879 B1. Each of the two components, which are referred hereinafter also as coating material A and coating material B, is supplied to a flow rate meter by means of a feed pump. Valves are arranged downstream of the two flow rate meters, such valves being pneumatically opened and closed using a control. The rates of flow of the components A and B are measured with the help of the flow meter and corresponding electric measuring signals are sent to the control. If the set volume of the one component is reached, the material flow of this component is interrupted and the flow for the other component is immediately released. The two components A and B are supplied to a 2 chamber mixing block and subsequently definitively mixed in a mixing pipe mounted downstream and sent to a spray gun. However this embodiment has the disadvantage that the flow rate meters cannot be used any more in the case of abrasive materials since they are subject to too high wear.

SUMMARY OF THE INVENTION

An object of the invention is to present a sensor with which the position of a magnetic object can be recorded without contact.

Advantageously, the sensor according to the invention largely works wear-free. Another advantage is that the sensor can also be used in explosion endangered surroundings as it prevails for example when coating with solvent-containing lacquers.

Moreover, the sensor according to the invention can be used in a device for conveying and dosing coating material in order to record the rate of flow of the coating material. The coating material can consist of a number of different components such as for example water and water lacquer or solvents and lacquer. The sensor can also be used in a device for conveying and dosing mono-component or multi-component adhesives, foam and propellants, sealing material, color or casting compounds.

The object is solved by a sensor for detecting the position of a movable magnetic object with the characteristics according to claim 1.

The sensor according to the invention for detecting the position of a movable magnetic object includes a resistance track and a contact electrode arranged thereon. Moreover the sensor includes a magnetic position transmitter, which is developed in such a way that it can follow the magnetic object, that it can be moved along the contact electrode and through which the contact electrode can be brought into contact with the resistance track.

Another object is to present a conveying device having the sensor according to the invention, whereby the detecting of the rate of flow conveyed by the device takes place with the help of the sensor without contact. In addition, the conveying device should work wear-free.

The object is solved by a conveying device with the characteristics according to claim 8.

The conveying device according to the invention includes a feed pump and a motor for driving the feed pump. The feed pump or the motor have a driven component that is at least partially magnetic. Moreover, the conveying device includes a sensor for detecting the position of the component, whereby the sensor has a resistance track and a contact electrode arranged thereon. Moreover the sensor has a magnetic position transmitter, which is developed in such a way that it can follow the component, whereby the position transmitter can be moved along the contact electrode and whereby the contact electrode can be brought into contact with the resistance track using the position transmitter. Finally, the conveying device includes a control, which uses as actual value the sensor signal coming from the sensor.

Advantageous further developments of the invention result from the characteristics stated in the dependent patent claims.

In an embodiment of the sensor according to the invention, the position sensor is ferromagnetic or paramagnetic. If for example the object to be recorded is permanently magnetic, it suffices if the position transmitter is ferromagnetic.

In another embodiment of the sensor according to the invention, the position transmitter is shaped in such a way that a selective pressure can be generated with it on the contact electrode. By applying only a selective pressure on the contact electrode, the force necessary for producing the contact can be kept low. Moreover a selective contact between the contact electrode and the resistance track has the advantage that the position of the object to be recorded can be determined more specifically.

Advantageously, the position transmitter has the shape of a ball in the sensor according to the invention.

Moreover, it is of advantage if the casing of the sensor is produced from aluminum or from an electrically conductive synthetic material.

The sensor according to the invention can be used advantageously in a system for conveying coating material for coating the work pieces.

The magnetic component can be the piston or the piston rod of the motor in the conveying device according to the invention. The magnetic component can however also be the piston or the piston rod of the color stage or the coupling, which connects the motor to the color stage. The magnetic component can be ferromagnetic or permanently magnetic.

In an embodiment of the conveyor device according to the invention, the position transmitter is ferromagnetic or permanently magnetic.

In another embodiment of the conveyor device according to the invention, the position transmitter has the shape of a ball.

In a further development of the conveyor device according to the invention, another feed pump and another motor are provided for driving the other feed pump. Moreover, another sensor is provided in order to record the position of a driven magnetic component of the other motor or the other feed pump. The other sensor has a resistance track and a contact electrode arranged thereon as well as a magnetic position transmitter. The position transmitter is developed in such a way that it can follow the magnetic component and can be moved along the contact electrode. The position transmitter can bring the contact electrode in contact with the resistance track. The control is developed and can be operated in such a way that it controls the mixing ratio of the materials conveyed by the feed pumps with the help of the sensor signals.

BRIEF DESCRIPTION OF THE DRAWINGS

These and other aspects of the invention are apparent from and will be elucidated in details with reference to several embodiments with the help of 11 figures described hereinafter.

DETAILED DESCRIPTION OF THE DRAWINGS

Figure 1:
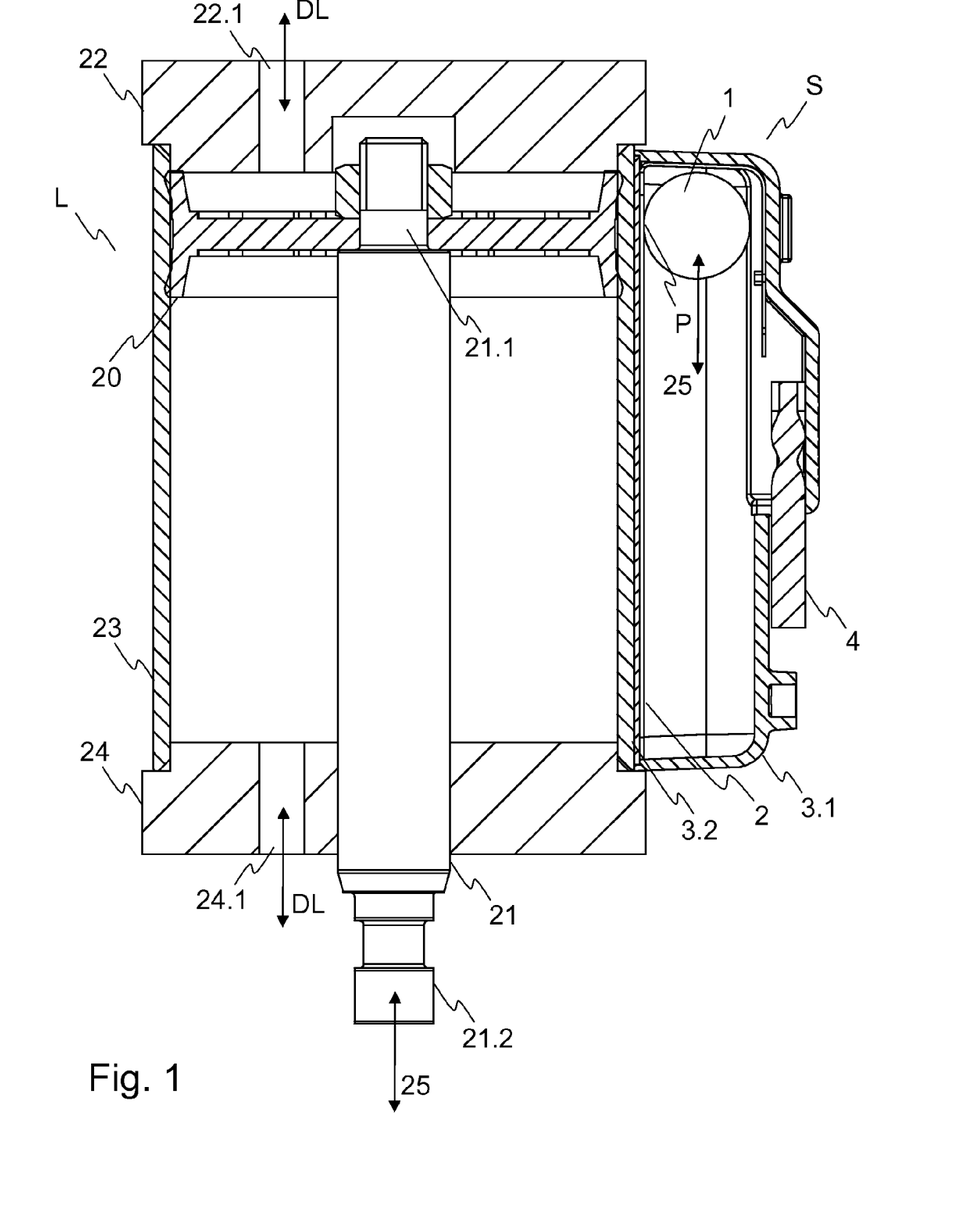
FIG. 1 shows a principle representation of a piston motor with a laterally installed sensor for detecting the position of the piston.

A piston motor L with a sensor S fixed laterally thereon for detecting the position of the piston 20 of the piston motor L is shown in the cross-section in FIG. 1. The piston motor L is operated with compressed air DL and therefore is also called air motor.

The piston motor L includes a cylinder, in which the piston 20 and a piston rod 21 are located movably. The piston rod 21 is connected to its upper end 21.1 to the piston 20. In order to move the piston 20 and the piston rod 21 the compressed air DL is impinged via bore holes 22.1 and 24.1 on the cylinder, consisting of a cylinder bottom 24, a cylinder wall 23 and a cylinder cover 22. If for example compressed air DL is led via the bore hole 22.1 into the cylinder, the piston 20 together with the piston rod 21 is pressed downward. The movement direction of the piston 20 and the piston rod 21 is marked by the arrow 25.

The piston 20 is developed completely or partially magnetically. If only one part of the piston 20 is developed magnetically, this takes place preferably on the side of the piston 20 turned towards the sensor S. The piston 20 can be equipped with a permanent magnet. Alternatively to it, the piston 20 can also be produced from a ferromagnetic material. In an embodiment, the piston 20 is made from steel.

The sensor S according to the invention is fixed on the outside of the cylinder wall 23. The sensor S includes a casing, consisting of a casing cover 3.1 and a casing bottom 3.2, and a potentiometer 2, which stretches over the entire stroke height of the piston 20 and is fixed on the casing bottom 3.2 of the sensor S. Moreover, the sensor S includes a magnetic position transmitter 1. In the embodiment shown in FIG. 1, the magnetic position transmitter 1 is developed as magnetic ball 1, which is attracted through magnetic forces by the piston 20. In FIG. 1 the ball 1 is at the upper end of the stroke path and presses on the position P on the potentiometer 2 as a result of the magnetic forces. If the piston 20 is now moved downward by the compressed air DL, the ball 1 follows the piston 20 as a result of the magnetic forces. In this way the pressure point P on the potentiometer 2 also moves downward, so that the electric resistance of the potentiometer 2 changes. As a consequence, the electric resistance is dependent on the position of the ball 1 and accordingly the position of the piston 20 and hence a measurement for the position of the ball 1 and accordingly the piston 20. The potentiometer 2 of the sensor S can be connected to an external evaluation electronics unit via the electrical connections 4.

In order not to influence the force coupling between the ball 1 and the piston 20, it is of advantage if the cylinder casing 23 consists of a non-magnetic material.

Figure 2:
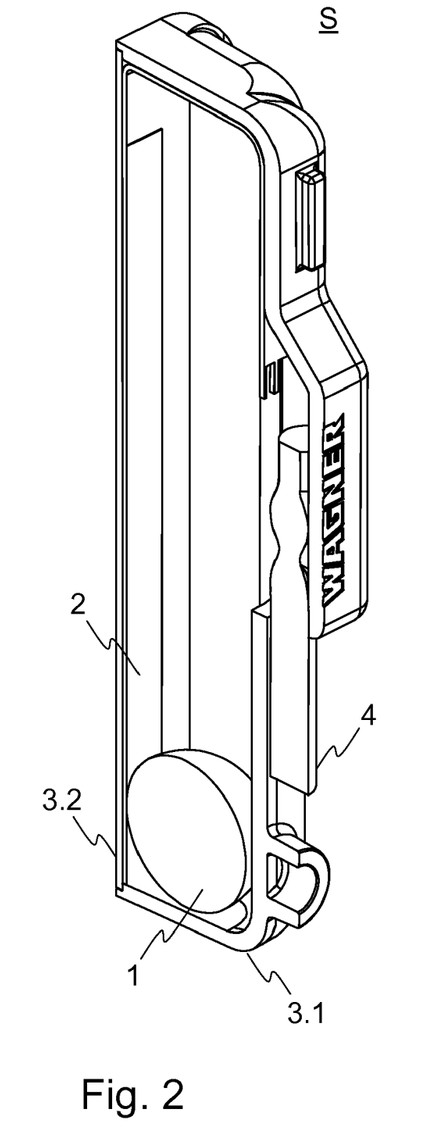
FIG. 2 shows a first possible embodiment of the sensor according to the invention for detecting the position of a movable object in a three-dimensional view in the longitudinal section.

In FIG. 2 the first embodiment of the sensor S according to the invention is shown in a three-dimensional view in the longitudinal section. The electrical connections 4 are thus led through laterally from the sensor S.

Figure 3:
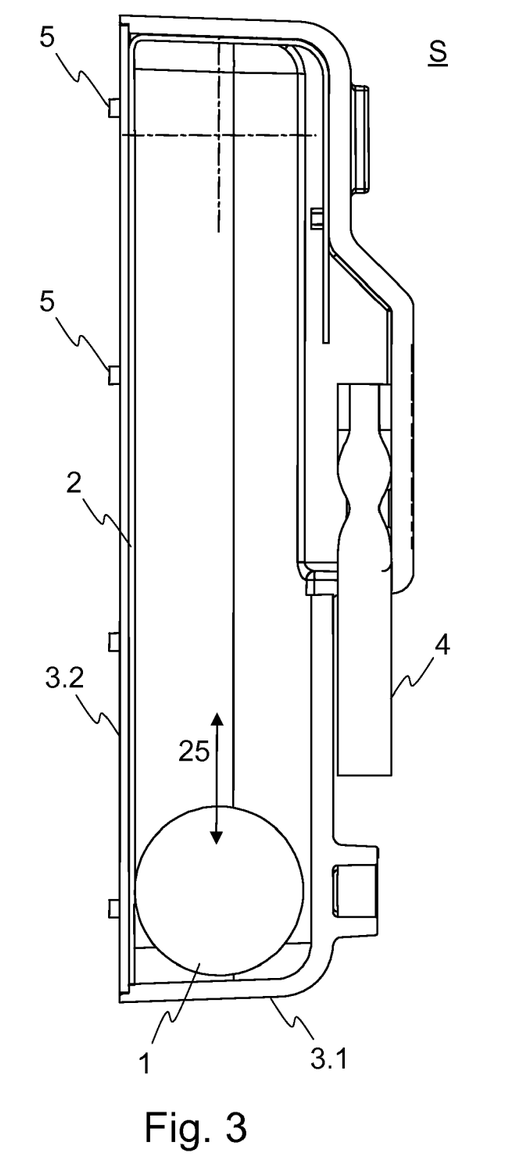
FIG. 3 shows a side view of the first embodiment of the sensor in the longitudinal section.

In FIG. 3 the first embodiment of the sensor S according to the invention is shown in a two-dimensional view in the longitudinal section. The potentiometer 2 can be stuck on the casing bottom 3.2. The casing bottom 3.2 has knobs 5 on the outside, which form the interface between the flat casing bottom 3.2 and the bent cylinder wall 23. With the help of the knobs 5 the sensor S can be installed on surfaces with different curvatures without it needing a structural adaptation of the sensor S.

Figures 4, 5, 7:
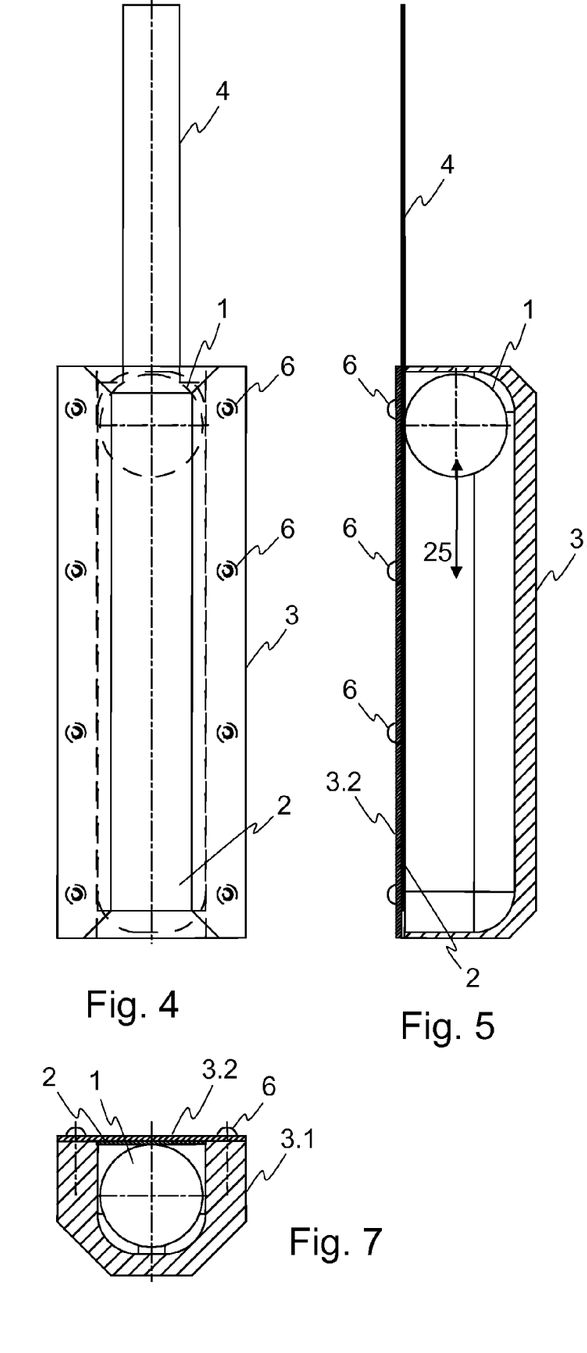
FIG. 4 shows a second possible embodiment of the sensor according to the invention for detecting the position of a movable magnetic object in a first side view.
FIG. 5 shows the second embodiment of the sensor in a second side view in the section.
FIG. 7 shows the second embodiment of the sensor according to the invention in the top view in the cross-section.
Figure 6:
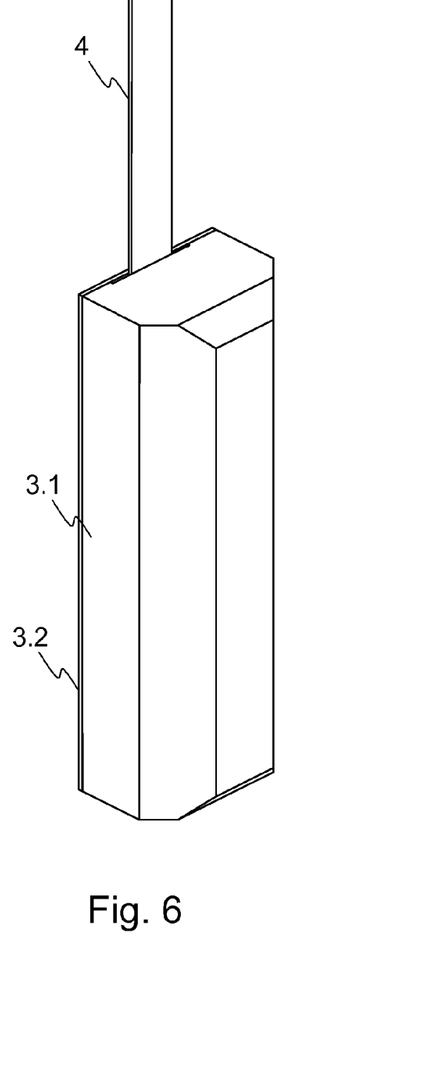
FIG. 6 shows the second embodiment of the sensor according to the invention in a three-dimensional view.

A second possible embodiment of the sensor S according to the invention is shown in the FIGS. 4, 5, 6 and 7. A first side view is shown in FIG. 4, a second side view in the longitudinal section is shown in FIG. 5, a three-dimensional view is shown in FIG. 6 and the cross-section of the second embodiment of the sensor according to the invention is shown in the top view in FIG. 7. The functioning of the sensors shown in the FIGS. 4 to 7 corresponds to the functioning of the sensors shown in the FIGS. 2 and 3. Unlike the first embodiment of the sensor, in the second embodiment of the sensor the electrical contact 4 is led through upward from the sensor casing 3.1, 3.2. The casing bottom 3.2 is screwed together with the casing cover 3.1 using several screws 6. The heads of the screws 6 additionally take on the same function as the knobs 5 of the sensor from the FIGS. 2 and 3.

The following applies to both embodiments of the sensor S. The casing cover 3.1 as well as the casing bottom 3.2 can be produced from an electrically conductive synthetic material as parts made from injection molding. Instead the sensor casing 3.1, 3.2 can also be produced from aluminum. If the casing is produced from aluminum, eddy current effects appear between the magnet ball 1 and the casing 3.1, 3.2, which has a favorable influence on the absorption of overswings and the jitters of the electric signal.

Figure 8:
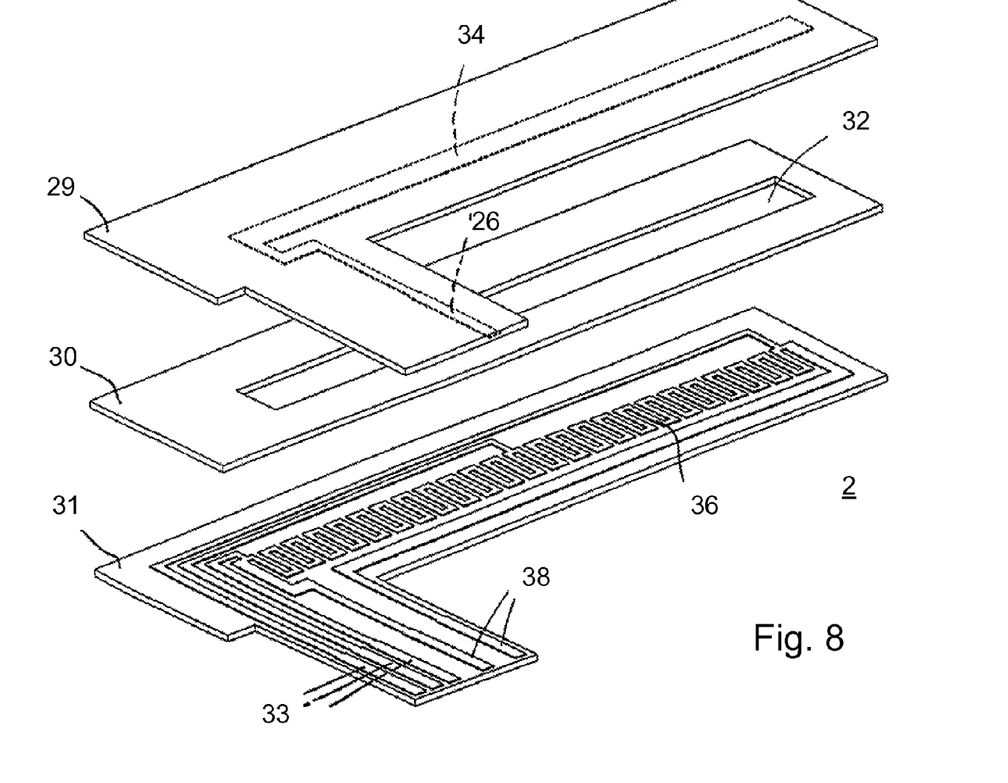
FIG. 8 shows a possible embodiment of a potentiometer as it can be used in the sensor according to the invention.

A possible embodiment of the potentiometer 2 is shown in an explosion drawing in FIG. 8. The potentiometer is developed as foil potentiometer. On a foil 31 is a resistance track 36 in the form of meanders, whose ends are developed as contact connections 38. Optionally the resistance track 36 can be equipped with calibration connections 33. Above the foil 31 another foil 30 is arranged, which has a corresponding recess 32 in the area of the resistance track 36. The foil 30 serves as distance keeper between the foil 31 and another foil 29. On the underside of the other foil 29 is a contact electrode 34 with an electrode connection 26. In the non-operative condition, that is, if no force is applied on the potentiometer 2, the contact electrode 34 and the resistance track 36 are distanced from each other so that no electrical contact exists between the contact electrode 34 and the resistance track 36. If a sufficiently big force is now initiated on the foil 29 and on the contact electrode 34 respectively - for example using the ball 1, the contact electrode 34 is pressed at the point, at which the force is initiated, on the resistance track 36, so that an electrical contact is produced at this position between the contact electrode 34 and the resistance track 36.

Figure 9:
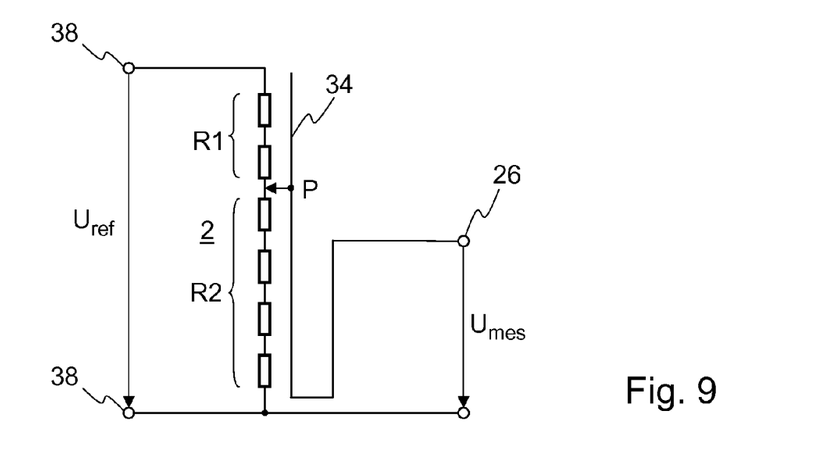
FIG. 9 shows the electric equivalent circuit diagram of the potentiometer.

The electrical equivalent circuit diagram belonging to the potentiometer 2 according to FIG. 8 is shown in FIG. 9. The potentiometer 2 works as voltage divider. If a reference voltage Uref is applied on the two electrodes 38 and the contact-electrode 34 is brought into contact with the resistance track 36 with the ball 1 at the pressure point P, the total resistance of the resistance track 36 is divided into two resistances R1 and R2. The voltage drop Umes measured on the resistance R2 is then a measurement for the position of the ball 1 and the piston 20 respectively.

Instead the potentiometer 2 can also be operated as variable resistance R2.

The sensor described in the patent disclosure document DE 43 35 004 A1 is suitable as potentiometer 2. Refer to the stated patent disclosure document with regards to the structure of the sensor S as well as the electrical connection, which is hereby part of the description.

The position transmitter 1 should be shaped in such a way that a selective pressure P can be generated by it on the contact electrode 34. A ball has proven to be the suitable shape for this purpose.

The position transmitter 1 can be ferromagnetic or permanently magnetic. If for example the piston 20 or a part of the piston 20 is developed as permanently magnetic, the position transmitter 1 can be ferromagnetic. However, if the position transmitter 1 is permanently magnetic, the piston 20 can be ferromagnetic.

Figure 10:
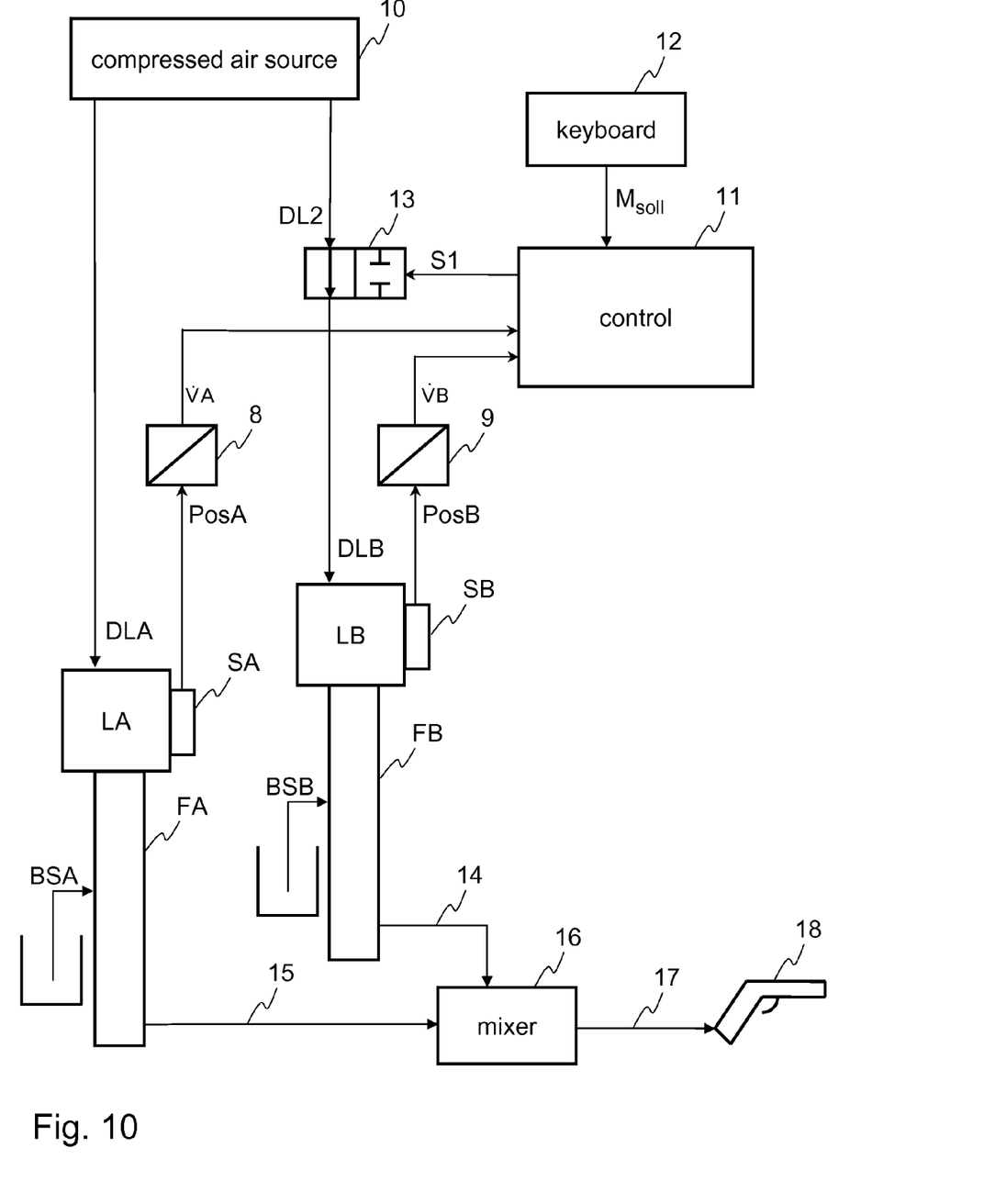
FIG. 10 shows a first possible embodiment of a device having the sensor for conveying and dosing two material components in form of a block diagram.

The sensor S according to the invention for detecting the position of the piston 20 can be used in a device for conveying and dosing two material components as shown in FIG. 10. In the system for conveying coating material, which is also referred to hereinafter as conveyor system, two components or coating materials BSA and BSB are conveyed and mixed. The component BSA can for example be lacquer and the component BSB can be a hardening agent.

The conveyor system includes a first air motor LA, which can have the structure described in FIG. 1. The air motor LA is driven using compressed air DLA and on the other hand it drives a color stage FA, which is also called feed pump. For this purpose the air motor LA is connected with the end 21.2 of the piston rod 21 to the color stage FA. The position of the piston of the air motor LA is recorded using a first sensor SA, which is shown as in the FIGS. 1 to 9. The color stage FA conveys coating material BSA via a pressure pipe 15 to a static mixer 16. Beside that, a second air motor LB is available, which is driven using compressed air DLB and which drives, on its part, a color stage FB. The air motors LA and LB, the sensors SA and SB as well as the color stages FA and FB can be equally built up. The color stage FB conveys coating material BSB via a pressure pipe 14 to the mixer 16.

In the mixer 16 the two coating materials BSA and BSB are mixed and afterwards led via a hose pipe 17 to a spray gun 18.

The sensor SA delivers a position signal PosA, which gives information about the position of the piston in the air motor LA. The quantity VA of the coating material BSA conveyed per time unit can be decided from the change in the position of the piston. Consequently, by means of a corresponding conversion unit 8, the quantity VA of the coating material BSA conveyed per time unit can be calculated from the temporal change of the position signal PosA, which is also called feeding stream, and can be made available as input quantity of the control 11.

A second sensor SB is arranged on the air motor LB, which is used for detecting the position of the piston of the air motor LB. The feeding stream VB is determined from the temporal progression of the position signal PosB generated from the second sensor by means of a corresponding conversion unit, the feeding stream conveying the feeding stage FB into the pressure pipe 14. This feeding stream VB is made available as further input signal of the control 11.

In order to be able to mix the two materials BSA and BSB in a certain ratio Msoll, a corresponding regulating circuit is provided, whereby the control 11 is part of the regulating circuit. By means of a keyboard 12 the mixing ratio Msoll between the two coating materials BSA and BSB, which is denominated Msoll, can be predetermined.

The control 11 calculates a corresponding regulating signal S1 from the two feeding streams VA and VB as well as the desired mixing ratio Msoll.

The regulating signal S1 serves as control signal for a control valve 13, which, as in FIG. 10, can be developed as 2-way solenoid valve. If the valve 13 is opened, the compressed air DL2 flows from the compressed air source 10 through the valve 13 and is applied, as compressed air DLB, on the second air motor LB. If the control valve 13 is, on the other hand, closed, compressed air does not flow any more through the valve 13, so that compressed air is not impinged on the air motor LB and the piston is not driven with it. As a result, the coating material BSB is also not conveyed any more via the color stage FB into the pressure pipe 14 to the mixer 16. Since however the compressed air DLA is still applied on the air motor LA, the color stage FA still conveys coating material BSA via the pressure pipe 15 to the mixer 16.

Instead of the 2-way valve shown in FIG. 10, a controllable pressure regulator can also be used, for example a proportional pressure regulator. In this case, the compressed air DLB can not only be turned on and off but can also be regulated as required.

Figure 11:
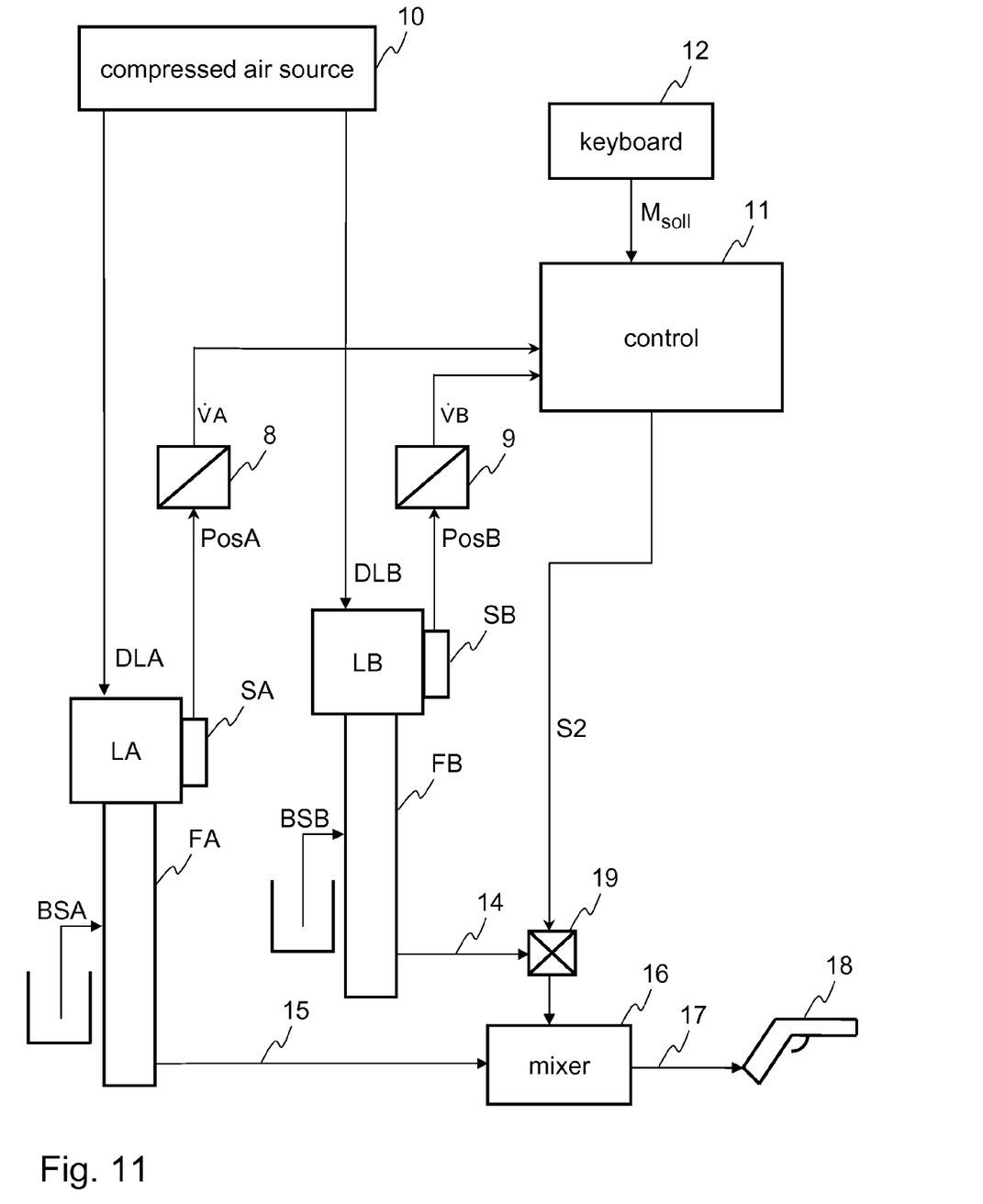
FIG. 11 shows a second possible embodiment of a device having the sensor for conveying and dosing two material components in form of a block diagram.

A second possible embodiment of a system for conveying coating material for coating work pieces is shown as block diagram in FIG. 11. The compressed air source 10, the air motor LA, the sensor SA, the tone FA, the air motor LB, the sensor SB, the tone FB, the mixer 16 and the spray gun 18 have the same structure as the components, as they are shown in FIG. 10. Instead of regulating the air as in the embodiment according to FIG. 10, the regulating can also take place on the color side according to the block diagram as per FIG. 11. For this purpose a pressure regulator 19 is connected to the color side between the mixer 16 and the color stage FB, such pressure regulator supplies more or less a lot of coating material BSB to the mixer 16, depending on the control signal S2 generated by the control 11. The control 11 calculates, as already described in the embodiment according to FIG. 10, from the two feeding streams V̇A and V̇B as well as the desired mixing ratio Msoll a corresponding regulating signal S2.

Which of the two embodiments of the conveyor system should be used, depends on the technical general conditions.

Instead of detecting the position of the piston 20 with the sensor S, it is also possible to record any other driven component of the motor L, LA, LB or of the color stage FA, FB with the sensor S. So, for example, the position of the piston rod 21 can also be recorded with the sensor S.

Advantageously the sensor S according to the invention can also be coupled without further ado to an existing air motor or to a color stage in order to measure its stroke without having to rebuild the air motor or the color stage.

The preceding description of the embodiments according to the present invention is used only for illustrative purposes and not for the purpose of restricting the invention. Different alterations and modifications are possible within the framework of the invention without leaving the scope of the invention and its equivalents.

REFERENCE SIGNS

1 Ball
2 Potentiometer
3.1 Casing cover
3.2 Casing bottom
4 Electrical connection
5 Knob
6 Screw or rivet
8 Signal converter
9 Signal converter
10 Compressed air source
11 Control
12 Keyboard
13 Regulating member
14 Pipe
15 Pipe
16 Mixer
17 Pipe
18 Spray gun
19 Regulating member
20 Piston
21 Piston rod
21.1 First end of the piston rod
21.2 Second end of the piston rod
22 Cylinder cover
22.1 Bore hole
23 Cylinder wall
24 Cylinder bottom
24.1 Bore hole
26 Connecting line
29 First foil
30 Second foil
31 Third foil
32 Recess
33 calibration connections
34 Contact electrode
36 Resistance track
38 Feeding pipe
BSA Coating material A
BSB Coating material B
DL Compressed air
DLA Compressed air for the air motor A
DLB Compressed air for the air motor B
DL2 Compressed air
FA Color stage A
FB Color stage B
L Air motor
LA Air motor A
LB Air motor B
P Pressure point
PosA Position of the piston A
PosB Position of the piston B
Si Regulating signal
S2 Regulating signal
S Position sensor
SA Position sensor for the air motor A
SB Position sensor for the air motor B
VA Feeding stream
VB Feeding stream
$M_{soll}$ Desired mixing ration

The invention claimed is:

1. A sensor for detecting the position of a moving magnetic object, comprising:
   a resistance track and a contact electrode arranged thereon, and
   a magnetic position transmitter, which is formed to follow the magnetic object, which can be moved along the contact electrode, and by means of which the contact electrode can be brought into contact with the resistance track,
   wherein the resistance track and the contact electrode are interposed between the magnetic position transmitter and the magnetic object.

2. A sensor according to claim 1, wherein the position transmitter is ferromagnetic or permanently magnetic.

3. A sensor according to claim 1, wherein the position transmitter is shaped to generate a selective pressure (P) on the contact electrode.

4. A sensor according to claim 1, wherein the position transmitter has the shape of a ball.

5. A sensor according to claim 1, comprising a casing made from aluminum.

6. A sensor according to claim 1, comprising a casing made from electrically conductive synthetic material.

7. A method of using the sensor according claim 1 in a conveying device for conveying coating material (BSA; BSB), adhesive, foam with propellant, sealing material, color or casting compound, comprising the steps of:
   arranging the sensor in association with a magnetic component of the conveying device which constitutes the moving magnetic object,
   obtaining an output signal based on the contact electrode being brought into contact with the resistance track by the position transmitter, and
   controlling the conveying device based on the output signal.

8. A conveying device, comprising:
   a feed pump (FA),
   a motor (LA) for driving the feed pump (FA),
   a sensor (SA) for detecting a position (PosA) of a driven magnetic component of the motor or the feed pump (FA),
   whereby the sensor (SA) has a resistance track and a contact electrode arranged thereon, and
   whereby the sensor (S) has a magnetic position transmitter, which is formed to follow the magnetic component, whereby the position transmitter can be moved along the contact electrode, and whereby the contact electrode can be brought into contact with the resistance track by means of the position transmitter,
   whereby the resistance track and the contact electrode are interposed between the magnetic position transmitter and the magnetic component, and
   a control, which is formed to operate using the signal (PosA) coming from the sensor (SA) for controlling.

9. A conveying device according to claim 8, wherein the component is a piston or piston rod of the motor (LA), a piston or piston rod of the color stage (FA) or a coupling, which connects the motor (LA) to the color stage (FA).

10. A conveying device according to claim 8, wherein the position transmitter is ferromagnetic or permanently magnetic.

11. A conveying device according to claim 8, wherein the position transmitter has the shape of a ball.

12. A conveying device according to claim 8, wherein the piston is ferromagnetic or permanently magnetic.

13. A conveying device according to claim 8, comprising:
    another feed pump (FB),
    another motor (LB) for driving the other feed pump (FB),
    another sensor (SB) for detecting the position (PosA) of a driven magnetic component of the other motor or the other feed pump (FB),
    whereby the other sensor (SB) has a resistance track and a contact electrode arranged thereon,
    whereby the other sensor (SB) has a magnetic position transmitter, which is formed to follow the magnetic component, whereby the position transmitter can be moved along the contact electrode, and whereby the contact electrode can be brought into contact with the resistance track by means of the position transmitter, and
    whereby the control is developed and can be operated in such a way that it controls the mixing ratio of the materials (BSA, BSB) conveyed by the feed pumps (FA, FB) by means of the sensor signals (PosA, PosB).

14. A conveying device according to claim 13, comprising:
    a compressed air source in order to supply the motor (LB) with compressed air (DLB), and
    an actuator controlled by the control, through which the compressed air (DLB) for supplying the motor (LB) can be regulated.

15. A conveying device according to claim 13, comprising:
    an actuator controlled by the control, through which a feeding quantity of the material (BSB) conveyed by the feed pump (FB) can be regulated.

* * * * *